H. SILVESTER.
Improvement in Wheels for Vehicles.

No. 129,865.                                        Patented July 23, 1872.

Witnesses:
H Carlin Clark
Charles E. Chinn

Inventor:
Henry Silvester by
Dyer, Beadle & Co. Attys

UNITED STATES PATENT OFFICE.

HENRY SILVESTER, OF ST. LOUIS, MISSOURI.

IMPROVEMENT IN WHEELS FOR VEHICLES.

Specification forming part of Letters Patent No. 129,865, dated July 23, 1872.

SPECIFICATION.

*To all whom it may concern:*

Be it known that I, HENRY SILVESTER, of St. Louis, in the county of St. Louis and State of Missouri, have invented a new and useful Improvement in Carriage-Wheels; and I do hereby declare that the following is a full and exact description of the same, reference being had to the accompanying drawing and to the letters of reference marked thereon.

Figure 1:
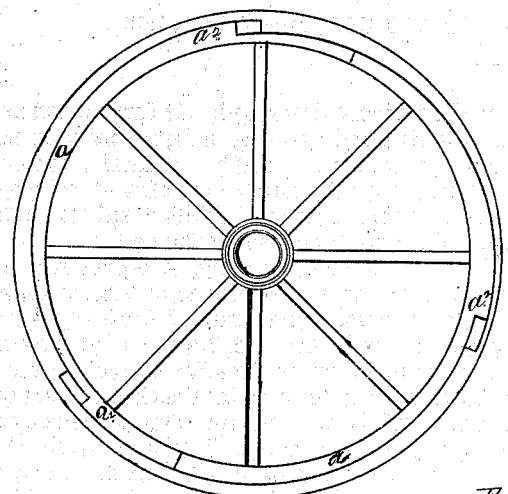
Figure 2:
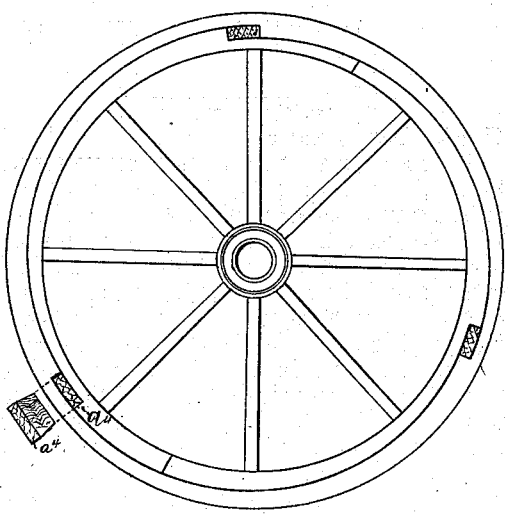
Figure 3:
Figure 4:
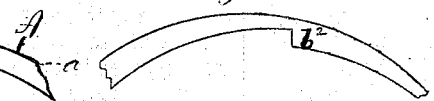
Figure 5:
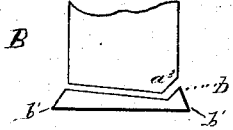
Figure 6:
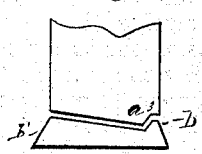
Figure 7:
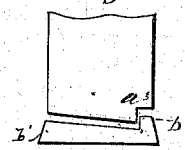
Figure 8:
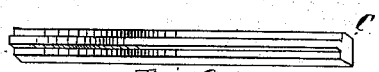
Figure 9:
Figure 10:
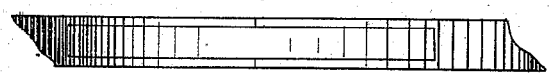

Figure 1 is a side elevation of a wheel containing my improvement, showing the relative position of the wheel and tire as manufactured. Fig. 2 is a side elevation of the wheel, showing the relative position of wheel and tire after the latter has been tightened or reset. It also shows the wedge or key-piece used for holding the parts firmly in position. Fig. 3 is a side elevation of a section of the rim of the wheel. Fig. 4 is a side elevation of a section of the tire. Fig. 5 is a cross-section of the rim and tire. Figs. 6 and 7 are cross-sections of modifications of the rim and tire. Fig. 8 is a perspective view of the felly-support. Fig. 9 is a cross-section of the felly and felly-support in position. Fig. 10 is a top view of the ends of two adjoining fellies, showing the felly-support in position.

Letters of like name and kind refer to like parts in each of the figures.

My invention is an improvement in the construction of wheels and wheel-tires, by means of which the tire can readily, cheaply, and with less than ordinary skill, be tightened or reset. It further relates to the construction of the rim of the wheel, by means of which, with less than ordinary expense, greater strength is secured. It consists, principally, in a carriage-wheel rim whose upper or outer face, instead of being a continuous circle, as in ordinary wheels, is provided with one or more serrations, combined with a tire whose under or inner face is shaped to conform to the serrations of the rim, substantially as and for the purpose specified. It further consists in a tire constructed, as described, of one or more vertical flanges, substantially as and for the purpose mentioned. It further consists in a tire whose outer face is wider than its inner, and whose sides are beveled evenly from outer to inner face, substantially as and for the purpose described. It further consists in a wedge or key-piece, substantially as and for the purpose set forth. It finally consists in a felly-support countersunk into the tops of the adjoining ends of the fellies, substantially as and for the purpose mentioned.

In the annexed drawing, A represents the rim of the wheel, which is composed of fellies *a a*, as is customary, and of ordinary width and thickness. Instead, however, of making the rim at its outer face an exact circle, as heretofore, I give to it in shaving a serrated form, as shown. The number of serrations shown in Figs. 1 and 2 is three; but in this respect I do not wish to be limited. In some cases it might be desirable to make use of but one; in others two, three, or more. The backs of the serrations are curvilinear, the curves, respectively, of which are arcs of circles whose centers lie in a circle, whose center in turn is coincident with that of the wheel. The faces of the serrations may be square, as shown, or inclined inward or outward. The upper corners of the rim are beveled or have a rabbet formed in them to receive the vertical, inwardly-projectly flanges of the tire, hereinafter described. Encircling the rim is a tire, B, whose inner face is shaped to conform to the outline of the rim. The tire is also provided, either at its sides or between them, with vertical flanges *b* projecting inward. These flanges afford material assistance in holding the tire onto the wheel. There may be one, two, or more of the flanges, and they may be similar or dissimilar. The form that seems preferable is shown in Fig. 5. Modifications are shown in Figs. 6 and 7. The tire is constructed wider at its outer face than at its inner, to protect the rim and spokes from abrasion. The sides of the tire from outer to inner face are beveled evenly, as shown more distinctly in Fig. 5, to prevent the collection of dirt upon the tire.

In Fig. 8 is shown what I term my felly-support. As constructed at present it is found that the rim of a wheel is weaker and gives way sooner at the joints between the fellies than elsewhere. To strengthen the rim at the places described there is countersunk into the upper side of and lengthwise with the rim, and at the ends of adjoining fellies, a piece of iron, C, that extends flush with the rim a distance nearly that between the two spokes between which the joint comes.

I do not wish to be limited to any particular shape in the construction of the felly-support, but prefer the T shape shown in Figs. 8 and 9.

To attach the tire to the wheel it will generally be found best to expand it by heat, as is customary. It is then placed upon the wheel in the ordinary way. Whenever the tire needs tightening or resetting, instead of taking it off and upsetting it or cutting and rewelding it, it is only necessary to turn the tire round on the wheel until it is fast, and then insert the key-piece shown in Fig. 2. In some cases it may be desirable to expand the tire slightly by heat, which may be done by warming a suitable piece of iron and laying it upon the tire until sufficiently warmed to secure the requisite amount of expansion. A very slight expansion will be found sufficient. Owing to the peculiar shape of the rim and tire the inner face of the latter, when it is turned, is brought close to the outer face of the former. At the same time a space is opened between the face of the rim serration and that of the corresponding part of the tire. Into this space it will sometimes be found necessary to firmly drive a key-piece, shown in Fig. 2. The tire when cooled will be found to be securely attached to the wheel.

The especial advantages possessed by this construction of wheel and tire are, first, the operation being simple and cheap, the tire can readily be tightened or reset by any person of ordinary skill, whether a professional blacksmith or not, thus rendering the improvement peculiarly valuable to those who desire to dispense with the cost of skilled labor, or who are unable to procure it. Second, by the insertion of the felly-support, which is simple and cheap in its construction and introduction, into the adjoining ends and upon the upper side of the fellies, and extending it nearly from spoke to spoke, the wheel, at a slight expense, is materially strengthened, and, as the felly-support is less expensive than the felly-plates that have hitherto been used on the under side of the rim, the cost of the entire wheel, according to my construction, is virtually cheapened; further, by dispensing with the felly-plates spoken of, the appearance of the wheel is improved. Third, by beveling the sides of the tire, the wheel, while protected from lateral wear, will be freer from dirt and will not throw as much dust and mud. As this style of wheel is intended more especially for localities that do not possess good roads, the value of this last-described improvement will be more apparent.

I am aware to manufacture the above-described tire by hand would be impracticable; but I have designed a system of rolls by which tire-iron of the shape in question can be rolled at almost the same cost as that of the ordinary kind.

Having fully described my invention, what I claim therein, and desire to secure by Letters Patent, is—

1. A carriage-wheel provided with the serrations $a^2$ $a^2$, in combination with the tire $b$ provided with the inner face $b^2$, substantially as described and shown.

2. A carriage-wheel provided with the serrations $a^2$ $a^2$ and the bevels $a^3$ or rabbets, in combination with the tire B provided with the inner face $b^2$ and the vertical flange $b$, substantially as described and shown.

3. In a carriage-wheel tire whose outer face is wider than its inner, the inclined sides $b^1$, substantially as described and shown.

4. The key-piece $a^4$, in combination with the tire B and the rim A, constructed and arranged as described and shown.

5. A felly-plate of the form shown and provided with a central rib extending throughout its entire length, as described.

This specification signed and witnessed this 20th day of April, 1872.

HENRY SILVESTER.

Witnesses:
CHAS. D. MOODY,
GEO. C. EICHBAUM.